(12) United States Patent
Ansari et al.

(10) Patent No.: US 7,673,087 B1
(45) Date of Patent: Mar. 2, 2010

(54) ARBITRATION FOR AN EMBEDDED PROCESSOR BLOCK CORE IN AN INTEGRATED CIRCUIT

(75) Inventors: Ahmad R. Ansari, San Jose, CA (US); Jeffery H. Applebaum, San Mateo, CA (US); Kunal R. Shenoy, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 174 days.

(21) Appl. No.: 12/057,322

(22) Filed: Mar. 27, 2008

(51) Int. Cl.
*G06F 13/14* (2006.01)

(52) U.S. Cl. .................. 710/241; 710/240; 710/309; 710/317; 370/911; 711/151

(58) Field of Classification Search .......... 710/109, 710/200, 220, 240, 241, 305, 317, 309; 370/351, 370/447, 449, 911; 711/151
See application file for complete search history.

(56) References Cited

U.S. PATENT DOCUMENTS

| | | | | |
|---|---|---|---|---|
| 5,392,033 A * | 2/1995 | Oman et al. | ............... | 710/107 |
| 5,440,752 A * | 8/1995 | Lentz et al. | ............... | 710/123 |
| 5,604,865 A * | 2/1997 | Lentz et al. | ............... | 710/316 |
| 5,754,800 A * | 5/1998 | Lentz et al. | ............... | 710/116 |
| 5,941,979 A * | 8/1999 | Lentz et al. | ............... | 712/33 |
| 6,034,542 A * | 3/2000 | Ridgeway | ............... | 326/39 |
| 6,098,109 A * | 8/2000 | Kotzur et al. | ............... | 709/249 |
| 6,209,053 B1 * | 3/2001 | Kurts | ............... | 710/113 |
| 6,219,763 B1 * | 4/2001 | Lentz et al. | ............... | 711/151 |
| 6,272,579 B1 * | 8/2001 | Lentz et al. | ............... | 710/116 |
| 6,389,480 B1 * | 5/2002 | Kotzur et al. | ............... | 709/249 |
| 6,493,786 B2 * | 12/2002 | Kikinis | ............... | 710/317 |
| 6,611,908 B2 * | 8/2003 | Lentz et al. | ............... | 712/29 |
| 6,665,755 B2 * | 12/2003 | Modelski et al. | ............... | 710/100 |
| 6,801,978 B2 * | 10/2004 | Sota | ............... | 710/317 |
| 6,892,259 B2 * | 5/2005 | Goodrum et al. | ............... | 710/244 |
| 6,934,780 B2 * | 8/2005 | Modelski et al. | ............... | 710/100 |
| 6,950,893 B2 * | 9/2005 | Chan | ............... | 710/240 |
| 6,981,077 B2 * | 12/2005 | Modelski et al. | ............... | 710/100 |
| 7,013,302 B2 * | 3/2006 | Modelski et al. | ............... | 707/10 |
| 7,133,950 B2 * | 11/2006 | Olukotun | ............... | 710/240 |
| 2004/0059862 A1 * | 3/2004 | Chan | ............... | 710/316 |
| 2006/0190904 A1 * | 8/2006 | Haji-Aghajani et al. | ....... | 716/17 |

FOREIGN PATENT DOCUMENTS

EP 854614 A2 * 7/1998

OTHER PUBLICATIONS

IBM Corporation. PLB Crossbar Arbiter Core. User's Manual. Jul. 2002.*

(Continued)

*Primary Examiner*—Mark Rinehart
*Assistant Examiner*—Matthew D Spittle
(74) *Attorney, Agent, or Firm*—W. Eric Webostad

(57) ABSTRACT

Arbitration for a processor block core is described. Master devices are associated with a processor block core embedded in a host integrated circuit ("IC"). The master devices are coupled to core logic of the host IC via a crossbar switch and a bridge, which are part of the processor block core. The crossbar switch includes an arbiter. An arbitration protocol is selected from among a plurality of arbitration protocols for use by the arbiter. Pending transactions having are polled for access to the bridge for arbitration using the arbitration protocol selected.

18 Claims, 8 Drawing Sheets

OTHER PUBLICATIONS

IBM Corporation. The CoreConnect Bus Architecture. 1999.*
Eberle et al. High-Radix Crossbar Switches Enabled by Proximity Communication. International Conference for High Performance Computing, Networking, Storage and Analysis. Nov. 15, 2008.*
U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.
IBM Doc. No. SA-14-2538-04, "128-bit Processor Local Bus Architecture Specifications", Ver. 4.6, Jul. 2004, 184 pages.
UG200 (v1.0), "Embedded Processor Block in Virtex-5 FPGAs", Jan. 15, 2008, 323 pages, Xilinx, Inc. 2100 Logic Drive, San Jose, CA 95124.
UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

ARBITRATION FOR AN EMBEDDED PROCESSOR BLOCK CORE IN AN INTEGRATED CIRCUIT

FIELD OF THE INVENTION

The invention relates to integrated circuit devices ("ICs"). More particularly, one or more aspects generally relate to arbitration for an embedded processor block core in an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters such as latency, transistor gate delay, data throughput, and the like designed into the embedded processors may be assumed to be present in the environment to which the embedded processors are to be coupled. Thus, even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs of the same size. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility, combined with the fact that such ASIC core memory controllers or peripherals implemented in FPGA fabric, may make FPGAs less attractive to users.

Accordingly, it would be desirable and useful to enhance performance of FPGAs without a significant loss of design flexibility associated with adding ASIC cores such as memory controllers or peripherals.

SUMMARY OF THE INVENTION

One or more aspects of the invention generally relate to arbitration for a processor block Application Specific Integrated Circuit ("ASIC") core for embedding in an IC having programmable logic.

An aspect of the invention relates generally to a method for arbitration. Master devices are associated with a processor block core embedded in a host integrated circuit. The master devices are coupled to core logic of the host integrated circuit via a crossbar switch and a bridge, where the bridge is for access to and from the core logic and for access from and to the crossbar switch. The crossbar switch and the bridge are part of the processor block core. The crossbar switch includes an arbiter. An arbitration protocol is selected from among a plurality of arbitration protocols for use by the arbiter. The master devices are polled responsive to the arbitration protocol selected to identify a first pending transaction with a ready status of a first master device of the master devices. The first pending transaction is sent from the first master device to the arbiter, and the first pending transaction is arbitrated by the arbiter for access to the bridge using the arbitration protocol selected.

Another aspect of the invention relates generally to another method for arbitration. Master devices are associated with a processor block core embedded in a host integrated circuit, and the master devices are coupled to core logic of the host integrated circuit via a crossbar switch, a first bridge, and a second bridge. Each of the first bridge and the second bridge are for access to and from the core logic and for access from and to the crossbar switch. The crossbar switch, the first bridge, and the second bridge are part of the processor block core. The crossbar switch includes a first arbiter and a second arbiter respectively for access to the first bridge and the second bridge, and the first arbiter and the second arbiter are independent of one another. A first arbitration protocol and a second arbitration protocol are selected from among a plurality of arbitration protocols respectively for use by the first arbiter and the second arbiter. The first arbitration protocol and the second arbitration protocol are capable of being same or different from one another for respective use by the first arbiter and the second arbiter. The master devices are polled to identify a master device of the master devices having a pending transaction for either the first bridge or the second bridge.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings. Thus, core logic may be either a hard core, a soft core, or a combination of a hard core and a soft core.

Figure 1:
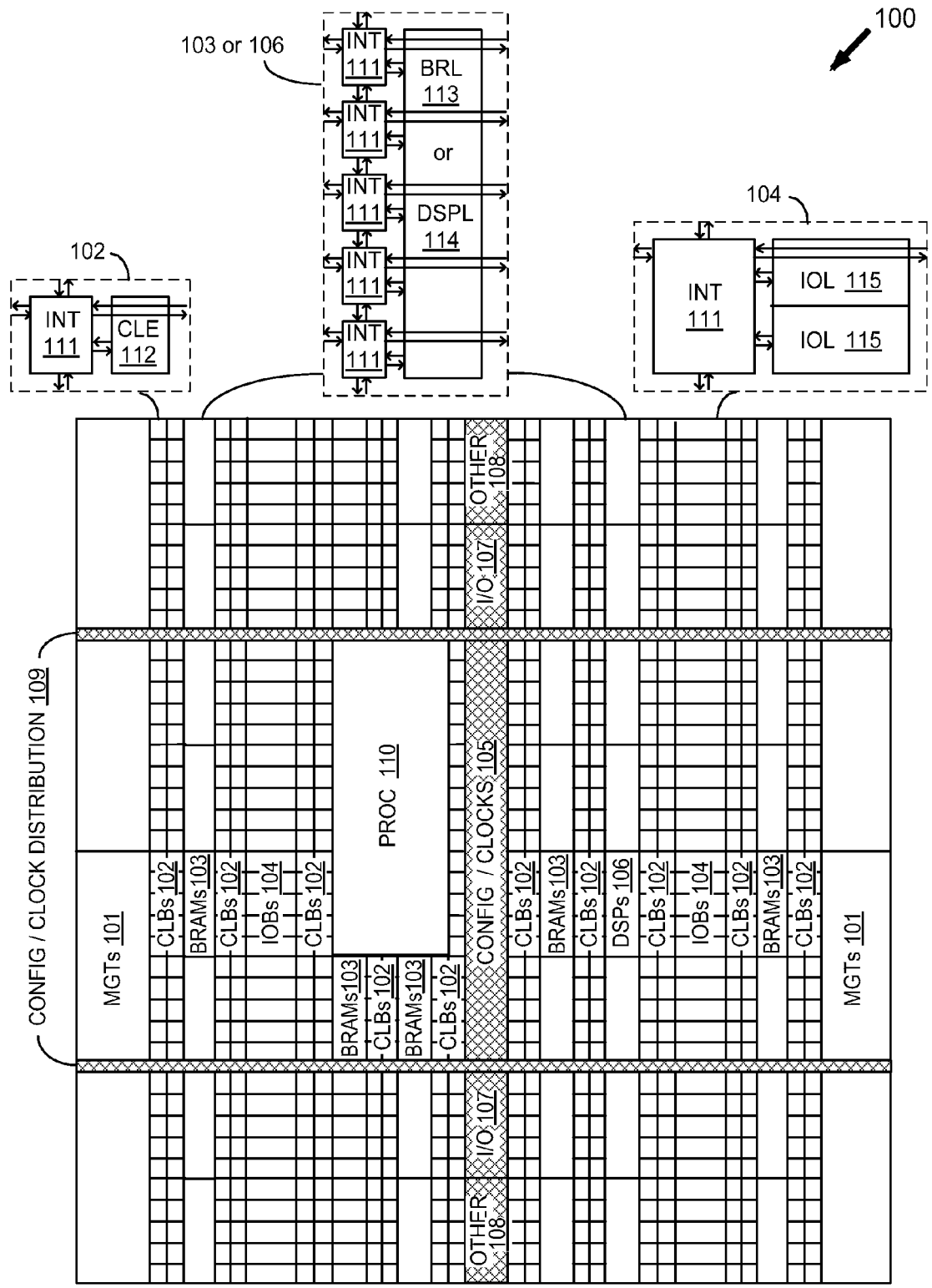
FIG. 1 is a simplified block diagram depicting an exemplary embodiment of a columnar Field Programmable Gate Array ("FPGA") architecture in which one or more aspects of the invention may be implemented.
Figure 2:
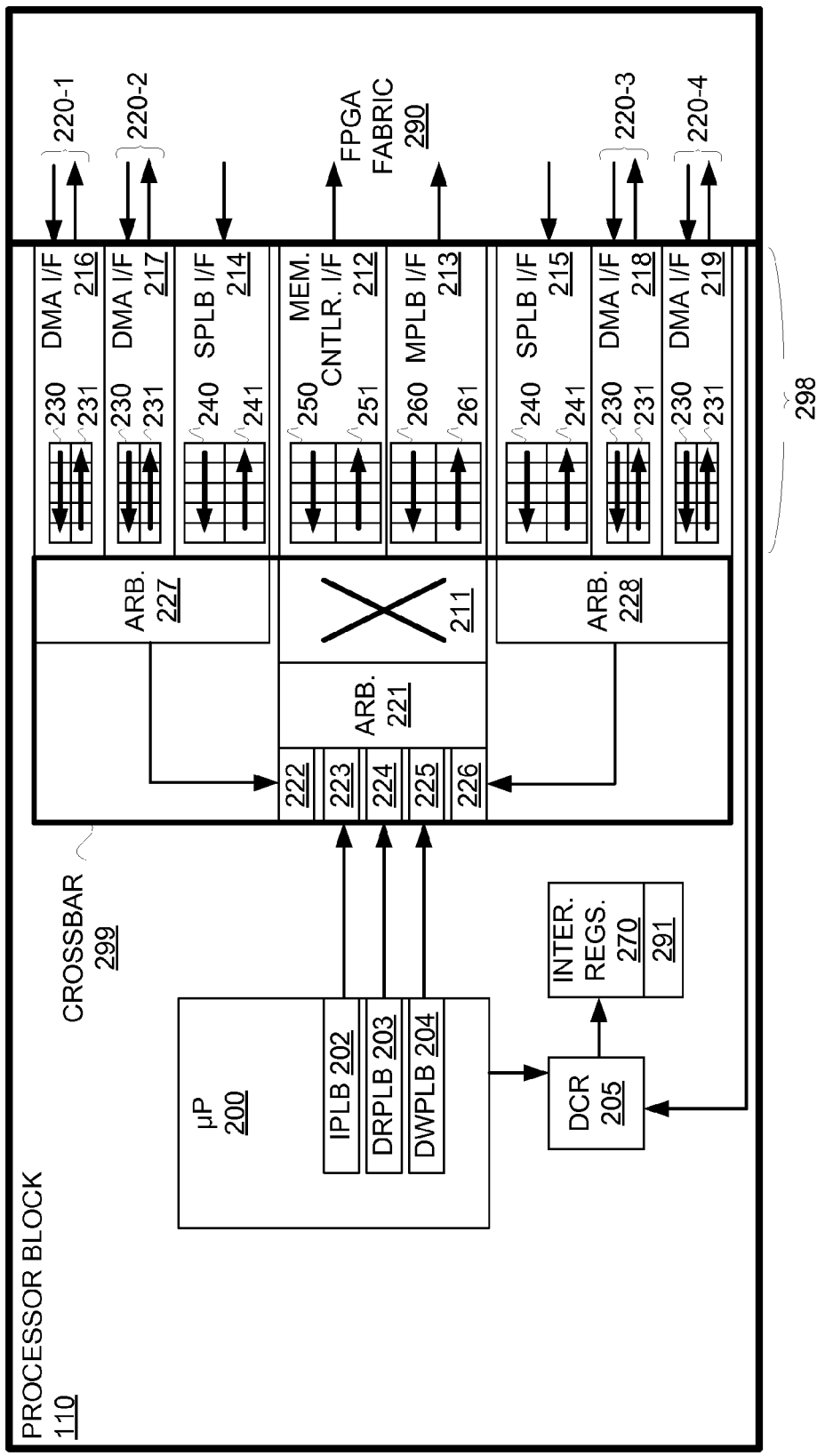
FIG. 2 is a block diagram depicting an exemplary embodiment of an ASIC processor block core ("processor block") embedded in the FPGA of FIG. 1.

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1, in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290, to which processor block 110 is coupled. Processor block 110 includes registers, such as internal registers 270, which may be set in order to condition processor block 110 for any of a variety of user selectable configurations, as described below in additional detail.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

Arrows in FIG. 2 indicate the direction of a transaction. Thus, for example, register input provided to DCR 205 may be from a transaction initiated by microprocessor 200 or DCR master devices in FPGA fabric 290. One or more master devices (not illustratively shown in FIG. 2), other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215, or an external DCR interface to DCR interface 205. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges. DMA interfaces 216 and 219 may be coupled to FPGA fabric by local links 220-1 through 220-4, respectively, as described in additional detail below with respect to FIG. 3. DMA interfaces 216 through 219, SPLB interfaces 214 and 215, memory controller interface 212 and MPLB interface 213 are collectively referred to herein as "interfaces 298."

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 includes a respective inbound FIFO 240 and an outbound FIFO 241. Lastly, each DMA interface 216 through 219 includes a respective inbound FIFO 230 and outbound FIFO 231. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Order of transactions is preserved via pipelines and buffers, including one or more command buffers. For example, a command buffer (not shown for purposes of clarity) may be for multiple transactions targeted to memory controller interface 212 for example. Likewise, another command buffer (not shown for purposes of clarity) may be for multiple transactions targeted to MPLB interface 213 for example.

In the exemplary embodiment of processor block 110, crossbar 299 is a five-to-two crossbar. In other words, there are five ports, respectively associated with decoders 222 through 226, for coupling to two blocks, respectively memory controller interface 212 and MPLB interface 213. Alternatively, a nine-to-two crossbar or some other crossbar configuration may be used; however, for reasons of anticipated utilization and relative clock rates, a five-to-two crossbar 299 is illustratively shown. With respect to five possible master devices requesting access to crossbar 299 at the same time, arbitration is used as provided by arbiter 221.

FIFOs of processor block 110, in addition to facilitating adaptation to differences in bandwidth, facilitate processing transactions concurrently by pipelining such transactions. As described below in additional detail, switch 211 is a nonblocking crossbar switch, and once access is granted to switch 211 execution happens immediately. Furthermore, because memory controller interface 212 is capable of operating at the rated frequency of microprocessor 200, performance level of memory controller interface 212 is substantially greater than circuits instantiated in CLBs or other programmable logic of FPGA fabric 290. A master device, for example instantiated in FPGA fabric 290 or another ASIC core of FPGA 100, may be coupled to processor block 110 via an SPLB interface of SPLB interfaces 214 or 215 or a DMA interface of DMA interfaces 216 through 219.

Other master devices, such as other ASIC cores, other processors whether instantiated in FPGA fabric 290 or as ASIC cores, or other circuits whether ASIC cores or instantiated in FPGA fabric 290, may be coupled to processor block 110 via any of DMA interfaces 216 through 219 or SPLB interfaces 214 or 215. In short, transactions go into and out of crossbar 299 and interfaces 298 of processor block 110, and thus crossbar 299 and interfaces 298 in combination may be thought of as a bridge or bridges.

DMA interfaces 216 through 219 and SPLB interfaces 214 and 215 are master devices with respect to crossbar 299. DMA interfaces 216 through 219 are controlled via a DCR interface, described below in additional detail, by microprocessor 200 or other master devices implemented in FPGA fabric 290 and coupled via an external DCR interface to DCR interface 205. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215. Memory controller interface 212 and MPLB interface 213 are master interfaces with respect to "slave" devices coupled thereto via buses external to processor block 110.

Arbiters 227 and 228 may be implemented as round robin arbiters. Thus, for example, arbiter 227 may select any of DMA interface 216, DMA interface 217, or SPLB interface 214 in a round robin format. However, for SPLB interfaces 214 and 215 to have a right to request access to switch 211, SPLB interfaces 214 and 215 have stored therein a set threshold amount of data ready to be exchanged across switch 211. The threshold level of data may be set by a user. For DMA interfaces 216 through 219, this threshold level of data is not user settable, but rather is fixed by DMA protocol.

Again, the user may set the threshold amount of data for SPLB interfaces 214 and 215 to request access to switch 211. The minimum a user may set may be one quad word. However, once access is obtained, even if there is a partial quad word to process as part of such data meeting or exceeding a threshold amount, such partial quad word is processed along with the data for which access is granted.

Inbound FIFOs 230, 240, 250, and 260 allow data to be accumulated. Data is accumulated without overflowing any of FIFOs, 230, 240, 250, and 260. The threshold amount of data to be accumulated by each of SPLBs 214 and 215 may be individually set by register settings. Thus each of SPLBs 214 and 215 may have the same or different threshold settings. Such threshold settings include 1, 4, 8, or 16 quad words. Each cache line may be two quad words wide. To reduce request overhead to access switch 211, arbiters 227 and 228 preclude requests until a threshold amount of data has been accumulated in an inbound FIFO. This preclusion of requests may be thought of as a load-balancing, multiplexing protocol. Data flow out of outbound FIFOs 231, 241, 251, and 261 may be dependent upon master devices external to processor block 110, such as may be instantiated in FPGA fabric 290.

Crossbar 299 provides a non-blocking interconnection. By "non-blocking," it is meant that two different master devices may access two different slave devices simultaneously. For example, one of DMA interfaces 216 through 219 may access memory controller interface 212 simultaneously while microprocessor 200 accesses MPLB interface 213. However, multiple master devices may have multiple transactions that are pipelined to a single interface, such as either or both of interfaces 212 and 213.

Features set via configuration registers 270 of processor block 110, such as for example threshold data accumulation size, arbitration protocol, address mapping, priority assignment, error handling, and activation/deactivation of write posting, are accessible via a DCR 205. Additionally, default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Figure 3:
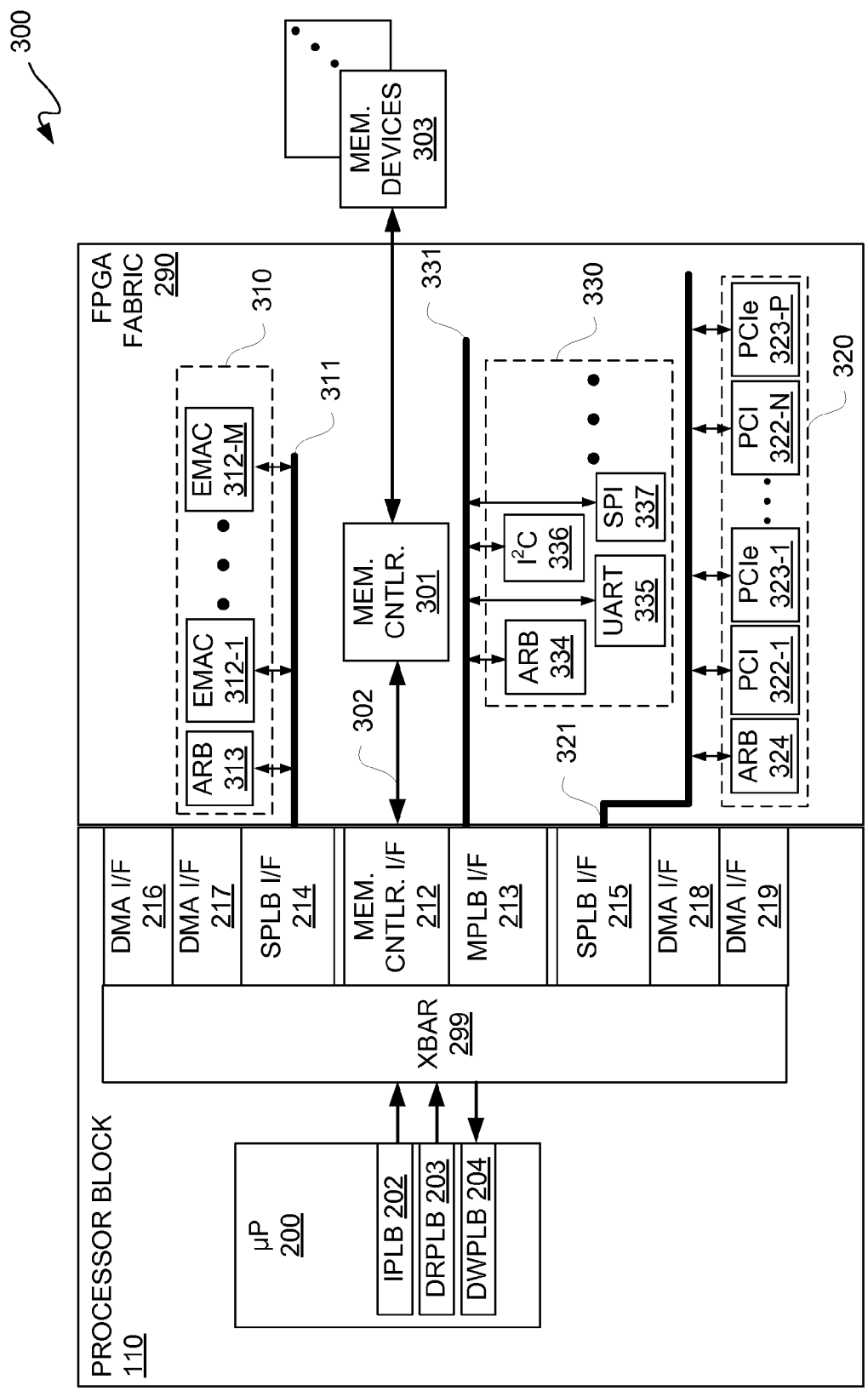
FIG. 3 is a block diagram depicting an exemplary embodiment of a system in which the processor block of FIG. 2 may be used.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via soft memory control interface bus 302. Buses 311, 321, and 331 may all be soft buses instantiated using PIPs of FPGA fabric 290. Memory controller 301 may be coupled to one or more memory devices 303, where such one or more memory devices 303 are either internal or external to FPGA 100.

As previously described, master devices may be instantiated in FPGA fabric 290. For example, one or more soft master devices 310 may be coupled to a soft SPLB 311 which is coupled to SPLB interface 214 of processor block 110. Soft SPLB 311 may have coupled to it one or more Ethernet media access controllers ("EMACs") 312-1 through 312-M, for M a positive integer greater than zero. There may be arbitration associated with access to SPLB 311 as indicated by arbitration block 313. EMACs 312-1 through 312-M are master devices, which in this exemplary embodiment are implemented in FPGA fabric 290 as soft master devices.

Moreover, one or more other soft, or hard, master devices 320 may be coupled to soft SPLB 321 which is coupled to SPLB interface 215. In this example, soft master devices of FPGA fabric 290 are PCI blocks 322-1 through 322-N, and PCI Express blocks 323-1 through 323-P, for N and P positive integers greater than zero. PCI blocks 322-1 through 322-N, and PCI Express blocks 323-1 through 323-P may be coupled to SPLB interface 215 via soft SPLB bus 321. An arbitration block as generally indicated by arbitration block 324 may be used to arbitrate access of PCI blocks 322-1 through 322-N and PCI Express blocks 323-1 through 323-P to SPLB 321.

As previously indicated, MPLB interface 213 is a slave device with respect to switch 211. However, MPLB interface 213 is master device with respect to slave devices coupled to soft MPLB 331. More particularly, one or more hard or soft slave devices may be coupled to soft MPLB 331. In this exemplary embodiment, soft slave devices 330 which are coupled to MPLB 331 are instantiated in FPGA fabric 290. Access to MPLB 331 may be arbitrated by an arbitration block 334. Examples of soft slave devices may include one or more instances of a UART 335, an I$^2$C block 336, an SPI block 337, or one or more other peripheral devices.

In the exemplary embodiment previously described with respect to FIG. 2, crossbar 299 provides command pipelining in command FIFOs for up to five transactions to each of memory controller interface 212 and MPLB interface 213 corresponding to the five master transaction inputs to decoders 222 through 226 of FIG. 2. However, as previously indicated, other command queue depths may be used.

Though not illustratively shown for purposes of clarity, hard or soft devices configured for DMA access may be coupled to DMA interfaces 216 through 219 via dedicated local links 220-1 through 220-4, respectively. However, soft buses conforming to DMA protocol may be used rather than dedicated buses. Thus, for example, a hard or soft device may be coupled to a local link which is coupled to a DMA interface of DMA interfaces 216 through 219 of processor block 110. An example of such a DMA soft or hard master device includes an EMAC, a PCI or PCIe device. In an implementation, these DMA-capable devices may be connected to DMA interfaces 216 through 219 through FIFOs, and DMA functionality may thus be in DMA interfaces 216 through 219 and not in such DMA-capable devices.

Figure 4:
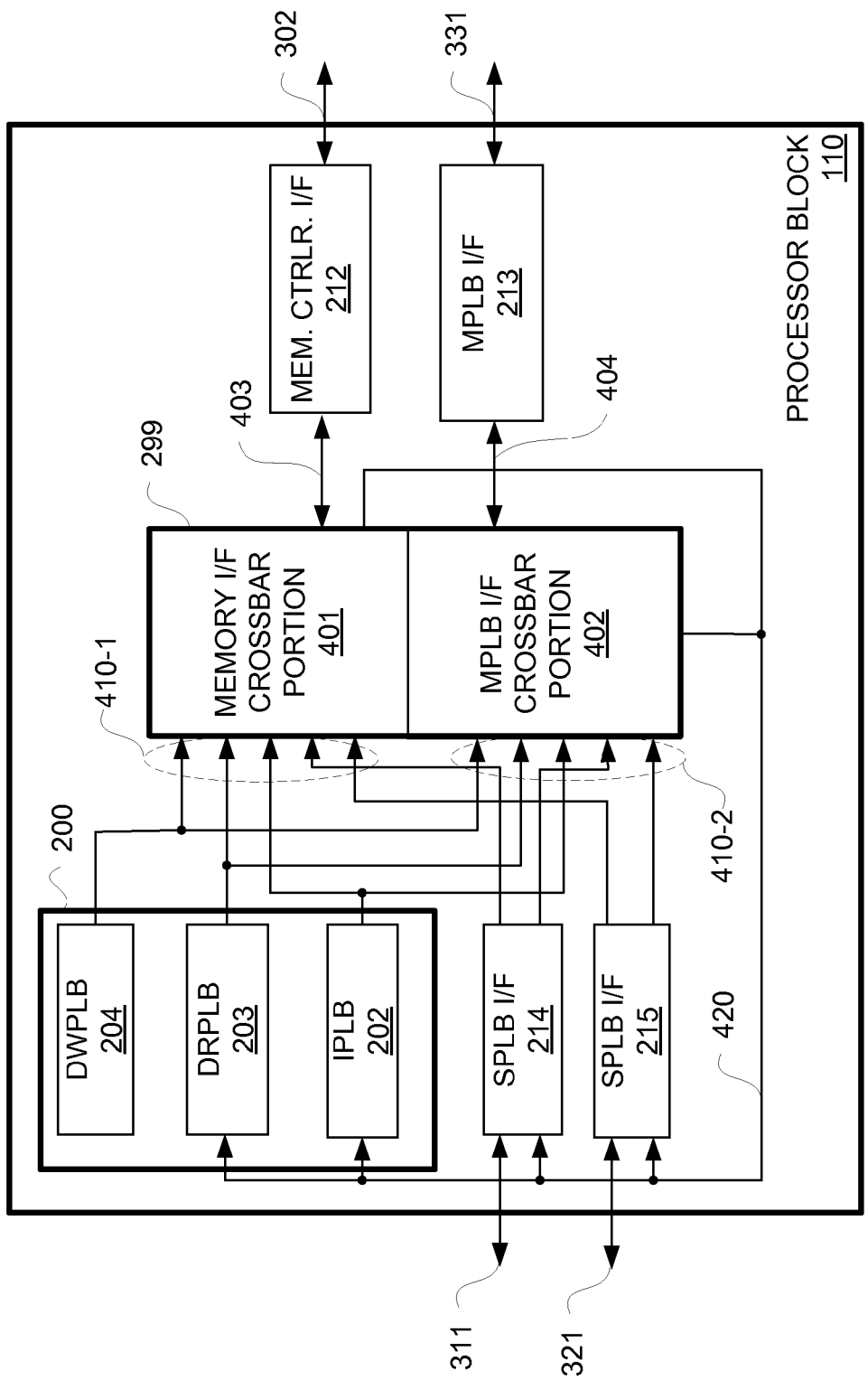
FIG. 4 is a block diagram depicting an exemplary embodiment of an interconnection for the processor block of FIGS. 2 and 3.

FIG. 4 is a block diagram depicting an exemplary embodiment of an interconnection for processor block 110 of FIG. 2. Processor block 110 is described with simultaneous reference to FIGS. 2 and 3.

DWPLB 204, DRPLB 203, and IPLB 202 of microprocessor 200 are each coupled to memory interface crossbar portion 401 and MPLB crossbar portion 402 of crossbar 299 to provide thereto write data, address, control, and arbitration information from microprocessor 200. Additionally, SPLB interfaces 214 and 215 are each coupled to memory interface crossbar portion 401 and MPLB crossbar portion 402 to provide thereto write data, address, control, and arbitration information from one or more master devices coupled to such interfaces 214 and 215 respectively via SPLB 311 and SPLB 321.

Portions 401 and 402 have separate arbitration logic, separate read and write command queues, and common crossbar logic, all of which are described below in additional detail. So, for example, switch 211 of FIG. 2 may be implemented as two switches, one for memory interface PLB 403 coupled to memory controller interface 212 and one for general purpose PLB 404 coupled to MPLB interface 213. For each of such switches, a respective arbitration block, a read command queue, and a write command queue are hardwired. Although decoders 222 through 226 are not illustratively shown in FIG. 4, it should be understood that address information has been decoded for directing a command to the appropriate location.

Each portion 401 and 402 receives write data, address, control, and arbitration information, generally indicated as master device information input 410-1 and 410-2, collectively and singly information input 410. It should be appreciated that such information input 410 is from an initiated transaction by a master device, such as any of the PLB masters in microprocessor 200 or a master device coupled to an interface of SPLB interfaces 214 and 215. Such an initiated transaction may be addressed for memory controller interface 212 or MPLB interface 213. DMA interfaces 216 through 219 are not illustratively shown for purposes of clarity and not limitation, as their interconnection shall be understood from the description herein of interconnecting SPLB interfaces 214 and 215. Arbitration protocol for an arbiter 221 of portion 401 and arbitration protocol for an arbiter 221 of portion 402 may be the same or different, and are user selectable from a set of arbitration protocols.

Figure 5:
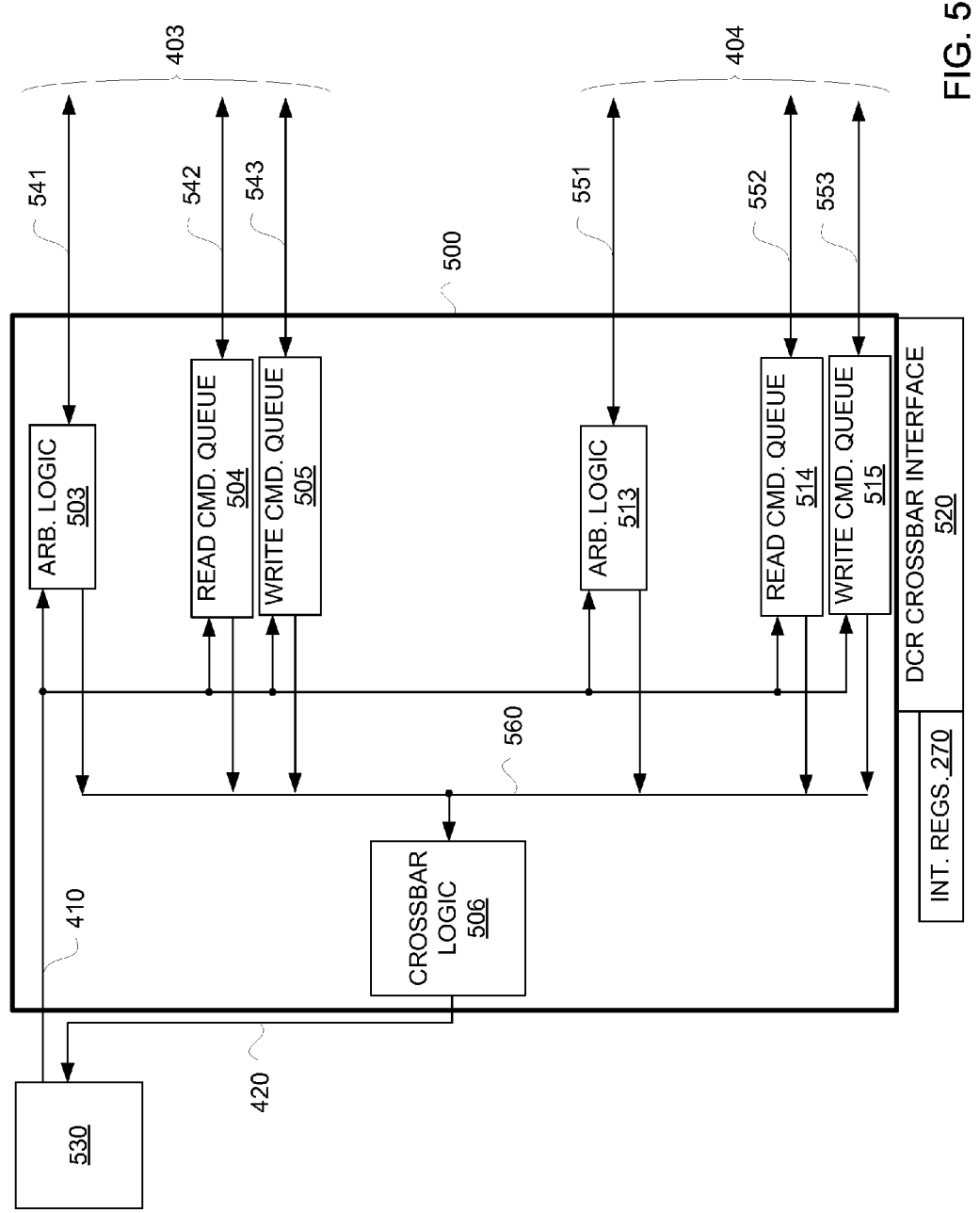
FIG. 5 is a block diagram depicting an exemplary embodiment of a crossbar structure, which may be used within the processor block of FIGS. 2 through 4.

FIG. 5 is a block diagram depicting an exemplary embodiment of a crossbar structure 500, which may be used for crossbar 299 of FIGS. 2 through 4. A two stage decoding process, namely decoding to select between memory controller interface 212 and MPLB interface 213 and decoding for an address of an address map, provides flexibility to a user while simultaneously reducing the number of bits involved to decode a requested address.

The remainder of this description is described with simultaneous reference to FIGS. 2 and 5.

A master device 530 provides information input 410 either to a set of blocks associated with memory controller interface bus 403 or to a set of blocks associated with general purpose MPLB 404. Each of these sets of blocks generally includes the similar circuits, namely the set associated with memory controller interface 212 includes arbitration logic 503, read command queue 504, and write command queue 505, and the set associated with MPLB interface 213 includes arbitration logic 513, read command queue 514, and write command queue 515. Arbitration logic 503, read command queue 504, and write command queue 505 are respectively associated with an address phase 541, a read data phase 542, and a write data phase 543 with respect to communication with memory controller interface 212 via memory controller interface bus 403. Arbitration logic 513, read command queue 514, and write command queue 515 are respectively associated with an address phase 551, a read data phase 552, and a write data phase 553 with respect to communication with MPLB interface 213 via general purpose MPLB 404.

To keep track of data phases which are outstanding, crossbar 299 maintains two command queues for each arbiter, namely one for reads, namely read command queues 504 and 514, and the other for writes, namely write command queues 505 and 515. Crossbar 299 uses the information stored in the command queues to direct the slave device data phase responses to the appropriate master device and to determine if its particular transaction has been completed.

Each arbitration logic module, namely arbitration logic 503 and 513, of arbiter 221 may generate its own set of arbitration mask signals with respect to master device signals. These mask signals may be combined together, such as with OR gate logic, for providing output information 420 to the correct transaction originating master device 530. Thus, crossbar logic 506 combines mask signals from a memory interface arbiter and an MPLB arbiter respectively of arbitration logic 503 and 513, and sources the resulting output to a requesting master device. When a master device, whether microprocessor 200 or a master device instantiated in FPGA fabric 290 for example, coupled to crossbar 299 requests a transaction to be performed, the identity of the requesting master device is temporarily stored with any other stored identities, in queues 504, 505, 514, and 515 depending on the transaction. The stored identity of a requesting master device may be used to steer returned data or control information, resulting from execution of such a transaction, to the requesting master device. The master device identity may be used to generate mask bits that control this steering.

Read and write command queues facilitate the pipelining of read and write data phases. For purposes of clarity by way of example and not limitation as previously described, read and write command queues may each be five deep and hence up to five read and four write data phases may be outstanding for any slave bus, namely buses 403 and 404. Of course even though the example depth of such command queues is five, other depths less than or greater than five may be used. If a master device issues a transaction which has or is granted access to crossbar 299, crossbar 299 arbitrates via arbitration logic 503 or 513, respectively, between such transaction and one or more other transactions from other master devices requesting use of a same interface of interfaces 212 and 213, respectively. A winner is ascertained within the same clock cycle and the request is put out on the slave address bus, and the byte enable ("BE") and size transfer qualifiers are pushed into a crossbar command FIFO, namely a read or write command queue as described above. Once a data phase of a transaction has been completed, the command FIFO is popped and used to redirect the transaction response signals from the slave device to the correct master device.

Crossbar structure 500 may be coupled to crossbar-DCR interface 520. As previously described, internal registers 270, which may be coupled to crossbar structure 500, may be set to configure crossbar 299, as well as the interfaces 298.

As previously described, crossbar 299 includes two separate portions 401 and 402, namely generally an arbiter, buffer and switch portion for memory controller interface 212 and an arbiter, buffer and switch portion for MPLB interface 213. These two portions for interfaces 212 and 213 are to support concurrent operations. Thus, separate arbitrations may occur concurrently.

Arbitration between commands may be decided, and the winning command, if more than two commands are present, is put into an output command queue, as previously described with reference to FIG. 5, and a PLB address valid status signal is asserted, as described below in additional detail. Thus, for example, if multiple master devices request access to crossbar 299 during a same cycle, all requesting master devices may receive an early address acknowledgement during that cycle. Arbiter 221 then decides the order of execution of the multiple commands, and places each command in the determined order into a command queue.

Arbitration as between commands may be any of a variety of forms of arbitration including: programmable fixed priority, where master devices are ordered from highest to lowest priority, with the highest priority master device always granted access for simultaneous requests; round robin, where access is generally granted to each master in a priority sequence that follows a round robin or circular order; or a least recently used, where a requesting master having the longest period between requests is granted priority.

Crossbar 299 may be configured such that a request priority overrides a fixed, round robin, or least recently used arbitration protocol. If a request priority feature is activated, a highest priority master device next in an arbitration cycle is granted access to crossbar 299. Again, by granting access to crossbar 299, it may mean that data has been accumulated in a sufficient amount such that a request is actually passed to crossbar 299.

Again, it should be appreciated that crossbar 299 may run at a substantially higher clock frequency than requesting master devices instantiated in FPGA fabric 290, as well as slave devices instantiated in FPGA fabric 290. Thus, arbitration as described herein for crossbar 299 divides available crossbar bandwidth among various active PLB master devices coupled to such crossbar 299.

Arbitration logic 503 and arbitration logic 513 arbitrate between requesting masters for the respective interfaces associated therewith. Thus, these arbiters queue requests in order of priority in accordance with a selected arbitration protocol.

Arbiter 221 accepts requests from multiple masters in the example of FIG. 2, namely five masters, namely arbiter 227, arbiter 228, IPLB 202, DRPLB 203, and DWPLB 204, and funnels them to either memory controller interface 212 or MPLB interface 213. Independent arbitration processes are maintained for both memory controller interface 212 and MPLB interface 213. In other words, the type of arbitration used by interfaces 212 and 213 may the same or different from one another.

If multiple master devices request access to a same interface of interfaces 212 and 213, crossbar 299 employs two levels of priority arbitration to determine the order of accesses. The first level of arbitration is referred to as request priority. Priority bits of a priority signal ("Mn_priority[0:1]"; for n being an index value indicating a master device) sent out by master devices via a PLB are the first priorities taken into consideration. If access order is resolved using these priority bits, then these priority bits determine the order of access among master devices when multiple requests are to be processed.

The second level of arbitration priority is referred to as master priority. If a tie emerges between two or more master devices having the same request priority level, crossbar 299 uses a second level of priority checking, namely checking using master priorities. Master priorities may be set by a user using internal registers 270 via DCR 205. Because master priorities are set to unique values, any possibility of a tie for a master priority level will be avoided.

Figure 8:
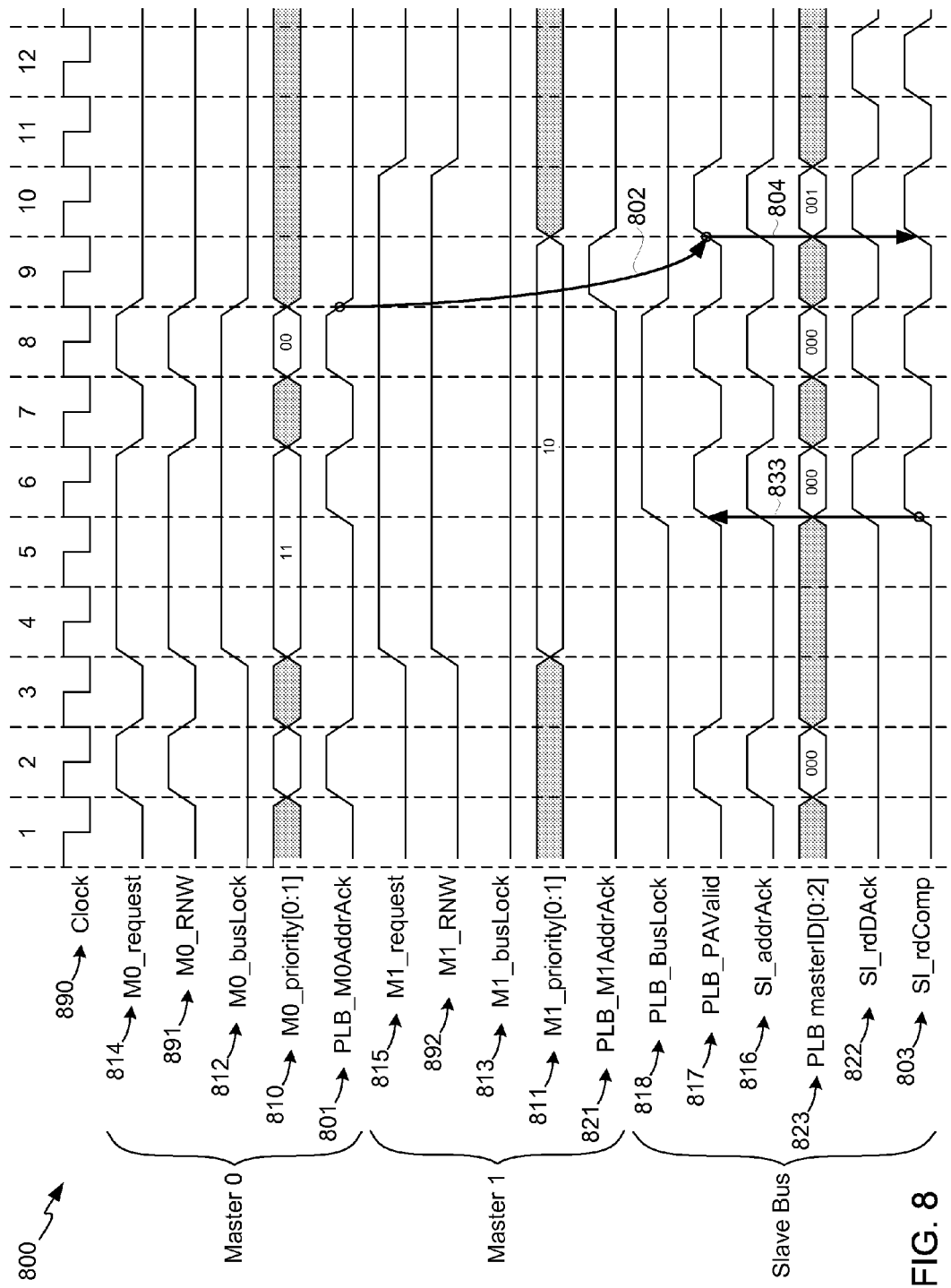
FIG. 8 is a timing diagram depicting an exemplary embodiment of lock timing.

Thus, for request priority level checking, multiple PLB master devices may request an access of either of interfaces 212 or 213 via crossbar 299 where the priority of each request is specified by a request priority signal, such as request priority signals 810 and 811 for master devices 0 and 1, respectively, of FIG. 8. On simultaneous or at least contemporaneous accesses to a same interface of interfaces 212 and 213, crossbar 299 grants access to a master device with the highest priority request. As indicated above, ties are resolved by a master priority level arbitration.

For breaking ties associated with request priority level, a user may set master priority level priorities for an arbitration protocol to be used. Crossbar 299 may include a DCR register such as of internal registers 270 for each of interfaces 212 and 213 to store master priority information in crossbar 299. Each master device may be assigned a priority using a multiple-bit priority field. Valid values may be specified for the various master devices, and each master device should have a unique priority from the permissible values to avoid ties at this level.

A user may select one of three arbitration protocols, namely least recently used ("LRU"), round robin ("RR"), and fixed. Crossbar 299 may maintain an internal copy of the priority values, which may change from the initial values set, after each access. For all arbitration protocols, crossbar 299 may be configured to allow the highest priority master device to access its target interface, namely of interfaces 212 and 213.

Priority values used for arbitration may be internal values. Thus, an arbitration register may be maintained for each of interfaces 212 and 213 to retain master priority levels for each master device. These registers may have their values reset using tie pins of processor block 110, which may be fed into a top portion of crossbar 299, via tie configuration ports. These registers may further be read and written to via DCR operations, as previously described.

In the following description, work-optimized arbitration flows 600 and 700 are described respectively with reference to FIG. 6 and FIG. 7. In a work-optimized arbitration flow herein, only those master devices ready with a transaction are polled, and when two or more of such master devices are ready with respective transactions, then such two or more master devices are polled in sequence from least recently used to most recently used for arbitration flow 600 of FIG. 6 or circularly in a round robin manner for arbitration flow 700 of FIG. 7.

A transaction is of a ready status, if a threshold amount data has been buffered or all the data for the transaction has been buffered in any of interfaces 214 through 219. This is to enhance bandwidth utilization. However, transactions initiated by microprocessor 200 always have a transaction ready status, regardless of whether data has been buffered for such transactions. This is because crossbar 299 and interface 212 or 213 run at the same speed or slower than microprocessor 200, and thus there is little to no negative impact in bandwidth utilization for immediately passing transactions from microprocessor 200 to crossbar 299 subject to arbitration. Furthermore, some transactions require no buffering of data at all, such as read transactions, and thus such transactions whether from microprocessor 200 or another master device have an associated transaction ready status upon receipt subject to command queuing.

Figure 6:
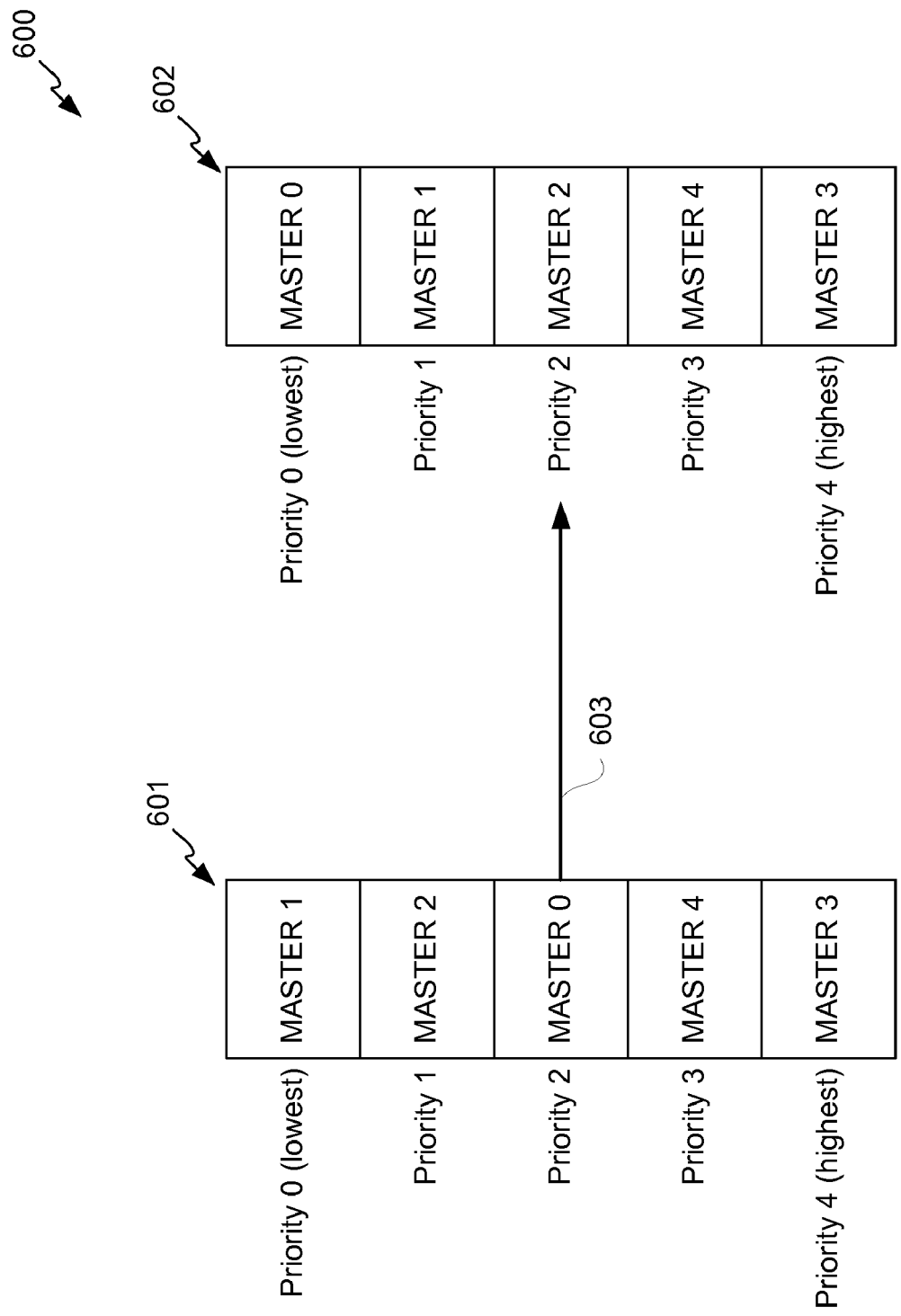
FIG. 6 is a flow diagram depicting an exemplary embodiment of a least recently used queue with priority arbitration flow.

FIG. 6 is a flow diagram depicting an exemplary embodiment of a least recently used queue with priority arbitration flow 600. Least recently used stack 601 indicates a possibility of five master devices labeled master 0 through 4, although fewer or more than five master devices may be used. In this particular example, master devices 1, 2, 0, 4, and 3 have the following register set priorities, 0, 1, 2, 3, and 4, respectively, with 0 being a lowest priority and 4 being a highest priority.

Suppose for example that master devices 1 through 4 do not have a sufficient amount of data to request access to switch 211 and that master 0 does have a sufficient amount of data to request access to switch 211. Thus, even though master 0 has a lower priority than for example master devices 3 or 4, master 0's request for access to crossbar 299 is granted, as generally indicated by line 603 pointing to a subsequent stack 602.

In an immediately subsequent stack 602 with respect to stack 601, priority of master 0 has been sent to a lowest priority, namely priority 0. Master 2 and master 1 have each been incremented one priority level up to priority 2 and priority 1, respectively. This is an example of how a least recently used queuing arbitration protocol may be used along with request priority.

Just because a device has the least recently used queue position does not mean that it will have immediate access to switch 211; rather, such master device may be subject to having a sufficient amount of data accumulated therefor in order for access to be granted to switch 211. As previously indicated, this threshold level of data may be set by a user.

Thus, in the least recently used arbitration, a master device with the highest internal priority is granted access to a slave bus accessible via either of interfaces 212 or 213. Internal master priorities are reassessed after each slave bus access, even if arbitration was based on request priority. Crossbar 299 maintains a queue with initial entries set up by a DCR accessible arbitration register, such as of internal registers 270. When a master device is granted access to a slave bus, such as via interfaces 212 or 213, such master device is removed and placed at the back of the least recently used queue. All master devices that were lower in internal priority to the master device granted access are moved up by a position.

Figure 7:
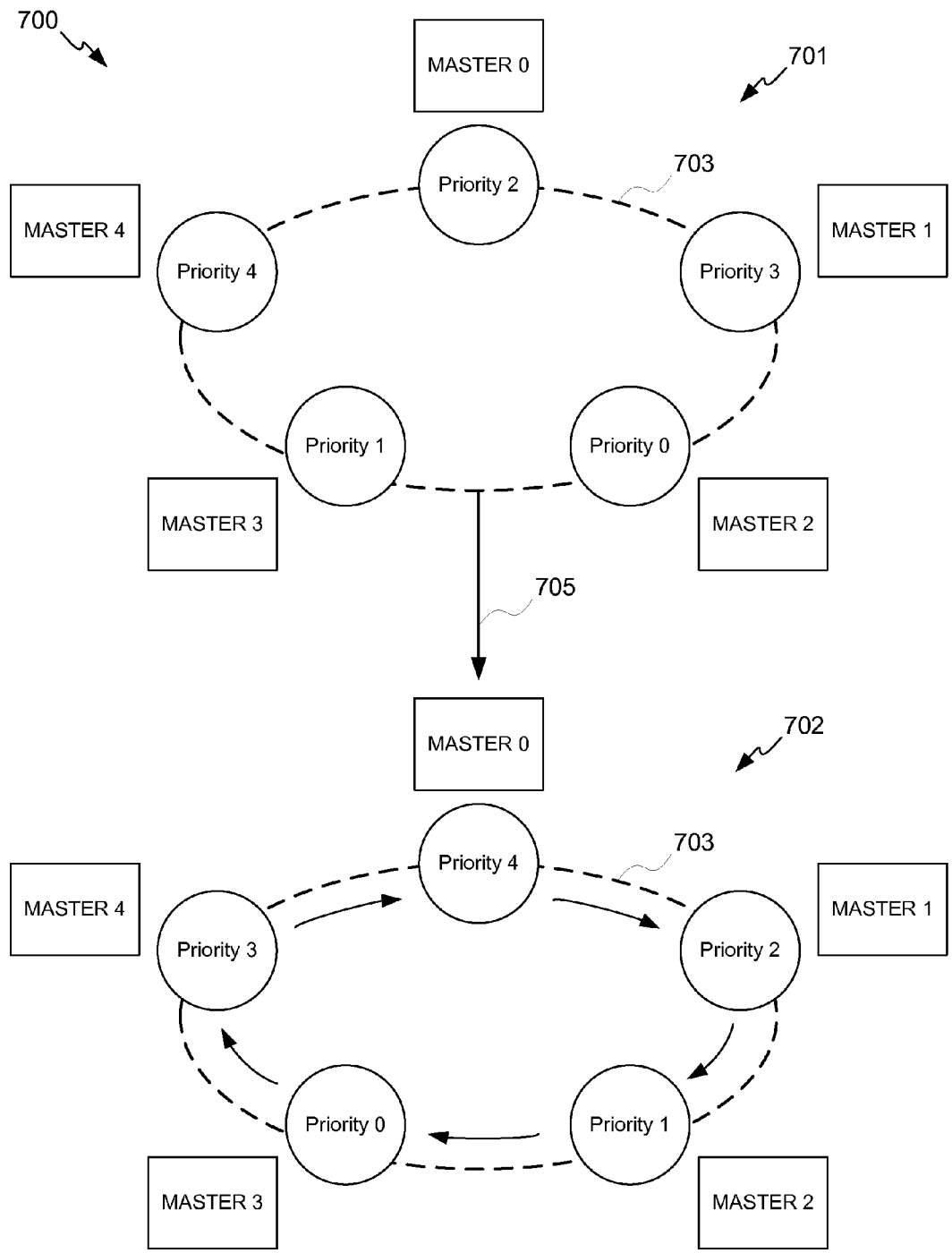
FIG. 7 is a flow diagram depicting an exemplary embodiment of a round robin queue with priority arbitration flow.

FIG. 7 is a flow diagram depicting an exemplary embodiment of a round robin queue with priority arbitration flow 700. Using the same priorities 0 through 4 for master devices labeled master 0 through 4 as in FIG. 6, arbitration flow 700 is further described.

In this example, with respect to a first round robin 701, master 0 has priority 2, master 4 has priority 4, master 3 has priority 1, master 2 has priority 0, and master 1 has priority 3. Round robin arbitration flow 700 polls in sequence around a loop 703 for those master devices with transaction ready status starting with a highest priority. Thus, for example, if master 3, which has priority 1, has a sufficient amount of data or exceeds a threshold level of data sufficient for being granted access to switch 211, master 3 may request access and be granted access to switch 211 when it is master 3's turn, as generally indicated by arrow 705.

Again, this is a work-optimized arbitration flow, as any of the master devices without a ready transaction is skipped, namely not polled. Master 3, having been granted access to crossbar 299, was at priority 1, and thus in a round robin for a sequence there was no master device with both a higher priority and transaction ready status.

However, on a next iteration of round robin arbitration flow 700, namely second round robin 702, priority of master 3 is decremented from priority 1 to priority 0. This is because the loop is shifted around such that master 3 receives the lowest priority, namely priority 0. Thus, master 0 receives priority 4, master 1 receives priority 2, master 2 receives priority 1, and master 4 receives priority 3, as this shifting of priorities is generally indicated by arrows of loop 703.

In round robin arbitration 700, a master device with the highest internal priority and having transaction ready status is granted access to either of interfaces 212 or 213. Internal master priorities are reassessed after each interfaces 212 or 213 access.

Crossbar 299 maintains a circular queue structure, in this example with five nodes where there is one node for each master coupled to crossbar 299. The master devices are initially assigned priorities based on a DCR arbitration register set up, such as programmed in as part of configuration bitstream provided by a user. When a master gets access to interfaces 212 or 213, the master's priorities are rotated such that the master granted access is now the lowest priority master.

Another arbitration that may be used involves a fixed priority, where initial priorities are set by a user and remain unchanged during crossbar operation. Crossbar 299 allows the highest priority master with transaction ready status to access interfaces 212 or 213. A fixed arbitration protocol, however, may cause starvation of lower priority master devices if higher priority master devices continually request accesses to the same interface of interfaces 212 or 213 for a prolonged period of time.

DCR arbitration registers, which may be part of internal DCR registers 270, may have five 3-bit priority fields, one for each master coupled to the crossbar, and a 2-bit arbitration mode field. Internal master priorities may be dynamically set by one or more master devices via DCR 205.

Accordingly, using internal registers 270, a user may select any one of three arbitration protocols for access to memory controller interface 212 via crossbar 299 and may select any one of three arbitration protocols for access to MPLB interface 213 via crossbar 299. The arbitration protocols selected for access to interfaces 212 or 213 may be the same or different. Furthermore, such arbitration protocols are work-optimized to avoid dead cycles, and thus enhance bandwidth utilization. Moreover, to enhance bandwidth utilization, only those transactions having a transaction ready status, such as have at least a threshold amount of data, are arbitrated to enhance bandwidth utilization. Note, that arbitration of transactions may be suspended if an associated interface 212 or 213 is locked by a master device in order to preserve order of commands.

FIG. 8 is a timing diagram depicting an exemplary embodiment of lock timing 800. A master device may lock an interface of interfaces 212 or 213, after which it has exclusive access to that bus until released by the master. Both of interfaces 212 and 213 may be locked at the same time by a master device; however, for purposes of clarity by way of example and not limitation it shall be assumed that only one of interfaces 212 and 213 is locked at a time. If interfaces 212 or 213 is locked by a master, all other master requests for such bus are ignored until the master locking such interface releases the interface. For example, either or both of interfaces 212 or 213 for access to associated slave buses may be locked by microprocessor 200. A locked status of either or both interfaces 212 or 213 may be for one or more transactions that are to be performed without any intervening operation, namely what is known as atomic transactions or atomic operations.

A master device ("Mn") asserts a lock signal ("Mn_bus-Lock," where n indicates a master device signal), such as lock signals 812 and 813, along with a request signal, such as request signals 814 and 815. Examples of signals for two master devices, namely master 0 and master 1 ("M0 and M1"), are illustratively shown, though fewer or more than two master devices may be used. Lock signals 812 and 813 are sampled by arbiter 221 in the same cycle that a slave address acknowledgment signal, such as address acknowledgement signal 816 which may be sent by arbiter 221 as a proxy to interfaces 212 and 213, is asserted on an interface of interfaces 212 and 213.

If both the read and write buses are idle, crossbar 299 looks to lock an interface of interfaces 212 and 213 for the requesting master. If there are outstanding transactions on the interface to be locked, crossbar 299 holds off assertion of PLB PAValid signal 817 for the locked transfer until the target interface of interfaces 212 and 213 is available. The lock extends to both the read and write sections of the interface of interfaces 212 and 213. The locking master maintains this lock by asserting Mn busLock. The request signal need not be continually asserted during the lock period and need only be asserted when a transfer is to be used.

A falling edge of master PLB address acknowledgment signal 801 for a master 0 causes a PLB PAValid signal 817 of an interface of interfaces 212 and 213 to transition, as generally indicated by arrow 802, and this corresponds to assertion of a slave read complete signal 803 as indicated by arrow 804. In cycle 0 (not shown) of clock signal 890, both master and interfaces 212 and 213 are assumed to be in an idle state. Master 0 requests via signals 814, 891 and 812 a non-locked single read transfer in clock cycle 2 and is granted access to interfaces 212 or 213. In clock cycle 4, master 0 requests a locked single read transfer as indicated by signals 814, 891 and 812, and master 1 requests a non-locked single read transfer as indicated by signals 815, 892, and 813. Since the request priority of master 0 is higher than master 1, as generally indicated by a comparison between register bit settings of request priority signals 810 and 811, master 0 wins the arbitration.

However, the pending transfer from cycle 2 blocks the assertion of PLB PAValid signal 817 for the locked master 0 request until the transfer completes in cycle 6. Once slave read complete signal 803 is asserted in cycle 6, crossbar 299 asserts PLB PAValid signal 817, as generally indicated by arrow 833, and PLB bus lock signal 818. PLB bus lock signal 818 is to set a lock state of an interface 212 or 213 for uninterrupted operation. The target interface of interfaces 212 or 213 is now locked for exclusive access by master 0, and the requests of master 1 are ignored.

In cycle 8, master 0 requests with a priority of 0 as indicated by request priority signal 810, namely a lower priority than that of master 1, and gets access to one of interfaces 212 and 213, because it has exclusive access to the bus. Once master 0 busLock signal 812 has been released in cycle 9, crossbar 299 waits for all pending transactions on the target interface of interfaces 212 or 213 to be completed, which takes place in cycle 10. Crossbar 299 then arbitrates in a non-locking condition and grants slave bus access to master 1.

From the master devices for PLB protocol data phase transfers in the same direction (either read or write), such transfers are expected to occur in the order in which they are originally issued. Thus, individual data phases do not need to contain any transfer identification, and the requesting master assumes that an occurring data phase is for the oldest pending transfer. The data phase for transfers in different directions occur on separate buses, and hence ordering between reads and writes is not required.

In a single interface of interfaces 212 and 213 PLB system, the arbiter need not be concerned with this ordering, because the arbiter simply forwards the transfer request to the interface of interfaces 212 and 213 which is responsible for ordering of the data phases. However, for processor block 110 having more than one interface, such as both of interfaces 212 and 213, there is more susceptibility to order mismatch even if interfaces 212 and 213 conform to the above described ordering.

If a master issues two consecutive requests in the same direction, either both read or both write requests, one to the MPLB interface 213 and one to memory controller interface 212, crossbar 299 holds off sending the second request to the target interface of interfaces 212 or 213 until the first transaction has completed.

Read not write signals ("Mn_RNW") 891 and 892 are read not write signals from master devices 0 and 1, respectively. These signals may be used to indicate whether a current transaction request is for a read or a write. Master PLB address acknowledgment signal 821 is the same as signal 801 but for master 1. Read data acknowledgment signal 822 is issued by interface 212 or 213, to a device instantiated in FPGA fabric 290 to acknowledge read data received therefrom. PLB master identification signal 823 is issued by interface 212 or 213, to indicate an identification number of a requesting master device for completing a transaction.

To avoid data mismatch possibility, data phase ordering is done by blocking a master request to either of interfaces 212 and 213 of the same direction (read or write) as a previous request to the other of interfaces 212 and 213 that is still pending. This may occur when a command queue for one of interfaces 212 and 213 is full and a command queue for the other one of interfaces 212 and 213 is not full. Requests to the same interface of interfaces 212 and 213 are not blocked if they are pending requests in the same direction. Ordering may be maintained in a command queue, such as a FIFO.

Transactions from the same master in the opposite direction to the pending transfer are not blocked from being issued to the other interface of interfaces 212 and 213. While a master is blocked from arbitration consideration due to ordering, crossbar 299 may arbitrate normally with the blocked master and grant access to the highest priority master. Two arbiters, namely arbitration logic 503 and 513, within arbiter 221, namely one for interface 212 and the other for interface 213, communicate with each other.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for arbitration, comprising:
   associating master devices with a processor block core embedded in a host integrated circuit;
   the master devices coupled to core logic of the host integrated circuit via a crossbar switch and a bridge;
   the bridge being for access to and from the core logic and for access from and to the crossbar switch;

the crossbar switch and the bridge being part of the processor block core;
the crossbar switch including an arbiter;
selecting an arbitration protocol from among a plurality of arbitration protocols for use by the arbiter;
polling the master devices responsive to the arbitration protocol selected to identify a first pending transaction with a ready status of a first master device of the master devices;
sending the first pending transaction from the first master device to the arbiter; and
arbitrating by the arbiter the first pending transaction for access to the bridge using the arbitration protocol selected.

2. The method according to claim 1, wherein the polling further includes:
identifying a second pending transaction with the ready status of a second master device of the master devices; and
placing the first pending transaction and the second pending transaction in a command queue of the bridge.

3. The method according to claim 2, further comprising:
assigning request priorities respectively to the master devices;
identifying a first request priority of the first pending transaction and a second request priority of the second pending transaction; and
the placing of the first pending transaction and the second pending transaction in the command queue being ordered responsive to the first request priority and the second request priority.

4. The method according to claim 3, wherein the arbitrating includes selecting the first pending transaction for access to the bridge prior to the second pending transaction responsive to the first request priority being higher than the second request priority.

5. The method according to claim 4, wherein the arbitration protocol is selected from a group consisting of round robin and least recently used.

6. The method according to claim 5, wherein the first request priority overrides the arbitration protocol.

7. The method according to claim 2, further comprising:
assigning request priorities respectively to the master devices;
setting master priorities respectively to the master devices;
identifying a first request priority of the first pending transaction and a second request priority of the second pending transaction as being equal;
identifying a first master priority of the master device and a second master priority of the second master device; and
the placing of the first pending transaction and the second pending transaction in the command queue being ordered responsive to the first master priority and the second master priority.

8. The method according to claim 7, wherein:
the master priorities are set for the arbitration protocol; and
the arbitration protocol is selected from a group consisting of round robin, and least recently used.

9. A method for arbitration, comprising:
associating master devices with a processor block core embedded in a host integrated circuit;
the master devices coupled to core logic of the host integrated circuit via a crossbar switch, a first bridge, and a second bridge;
each of the first bridge and the second bridge being for access to and from the core logic and for access from and to the crossbar switch;
the crossbar switch, the first bridge, and the second bridge being part of the processor block core;
the crossbar switch including a first arbiter and a second arbiter respectively for access to the first bridge and the second bridge;
the first arbiter and the second arbiter being independent of one another;
selecting a first arbitration protocol and a second arbitration protocol from among a plurality of arbitration protocols respectively for use by the first arbiter and the second arbiter;
the first arbitration protocol and the second arbitration protocol capable of being same or different from one another for respective use by the first arbiter and the second arbiter; and
polling the master devices to identify a master device of the master devices having a pending transaction for either the first bridge or the second bridge.

10. The method according to claim 9, wherein the arbitration protocol is selected from a group consisting of fixed, round robin, and least recently used.

11. The method according to claim 9, further comprising:
granting a locked status of the first bridge to the master device of the master devices for passing commands from the master device to the first bridge without arbitrating for access thereto with at least one other master device of the master devices having another pending transaction.

12. The method according to claim 11, wherein:
the polling includes identification of the at least one other master device having the other pending transaction; and
the polling is only of pending transactions having a ready status.

13. The method according to claim 11, further comprising:
the arbitrating access to the first bridge being suspended until the locked status of the first bridge is removed;
removing the locked status of the first bridge; and
arbitrating first pending transactions of the master devices for access to the first bridge.

14. The method according to claim 13, wherein the commands are for atomic operation.

15. The method according to claim 13, further comprising:
arbitrating second pending transactions of the master devices for access to the second bridge while the first bridge has the locked status.

16. The method according to claim 15, wherein the polling is only of the second pending transactions while the first bridge has the locked status.

17. The method according to claim 16, wherein the polling is only of the second pending transactions having a ready status.

18. The method according to claim 17, wherein the arbitration protocol is selected from a group consisting of round robin and least recently used.

* * * * *